United States Patent

Ferguson

[15] 3,655,151

[45] Apr. 11, 1972

[54] REREEFING PARACHUTE AND AERIAL RECOVERY SYSTEM

[72] Inventor: Otis B. Ferguson, Alamogordo, N. Mex.

[73] Assignee: Recovery Systems Research, Inc., Alamogordo, N. Mex.

[22] Filed: Dec. 29, 1969

[21] Appl. No.: 888,453

[52] U.S. Cl. ..........................................244/142
[51] Int. Cl. .........................................B64d 17/02
[58] Field of Search ...........................244/142, 145, 147

[56] References Cited

UNITED STATES PATENTS 3,385,539  5/1968  Ewing et al. ..........................244/142
2,942,815  6/1960  Gross et al. ........................244/142 X

*Primary Examiner*—Milton Buchler
*Assistant Examiner*—Carl A. Rutledge
*Attorney*—Reilly and Lewis

[57] ABSTRACT

A parachute for use as the main load-bearing device in a mid-air recovery system is provided with canopy rigging including intermediate load-bearing suspension lines connected at spaced points of attachment between an intermediate portion of the canopy and an attaching juncture of one of several groups of skirt suspension lines and an intermediate portion of one of several control lines disposed between a central portion of the canopy and the payload to provide a flattened canopy profile. An inflatable extension mounts on top of the parachute and together with a canopy-like cap portion which covers the top of the extension forms a lightweight balloon-like body or skin which confines a volume of air above the main parachute to support an engagement harness thereon. The inflatable body may be illuminated for night or inclement weather pick-ups and is capable of sustaining a target package such as a radio transmitter or the like.

13 Claims, 5 Drawing Figures

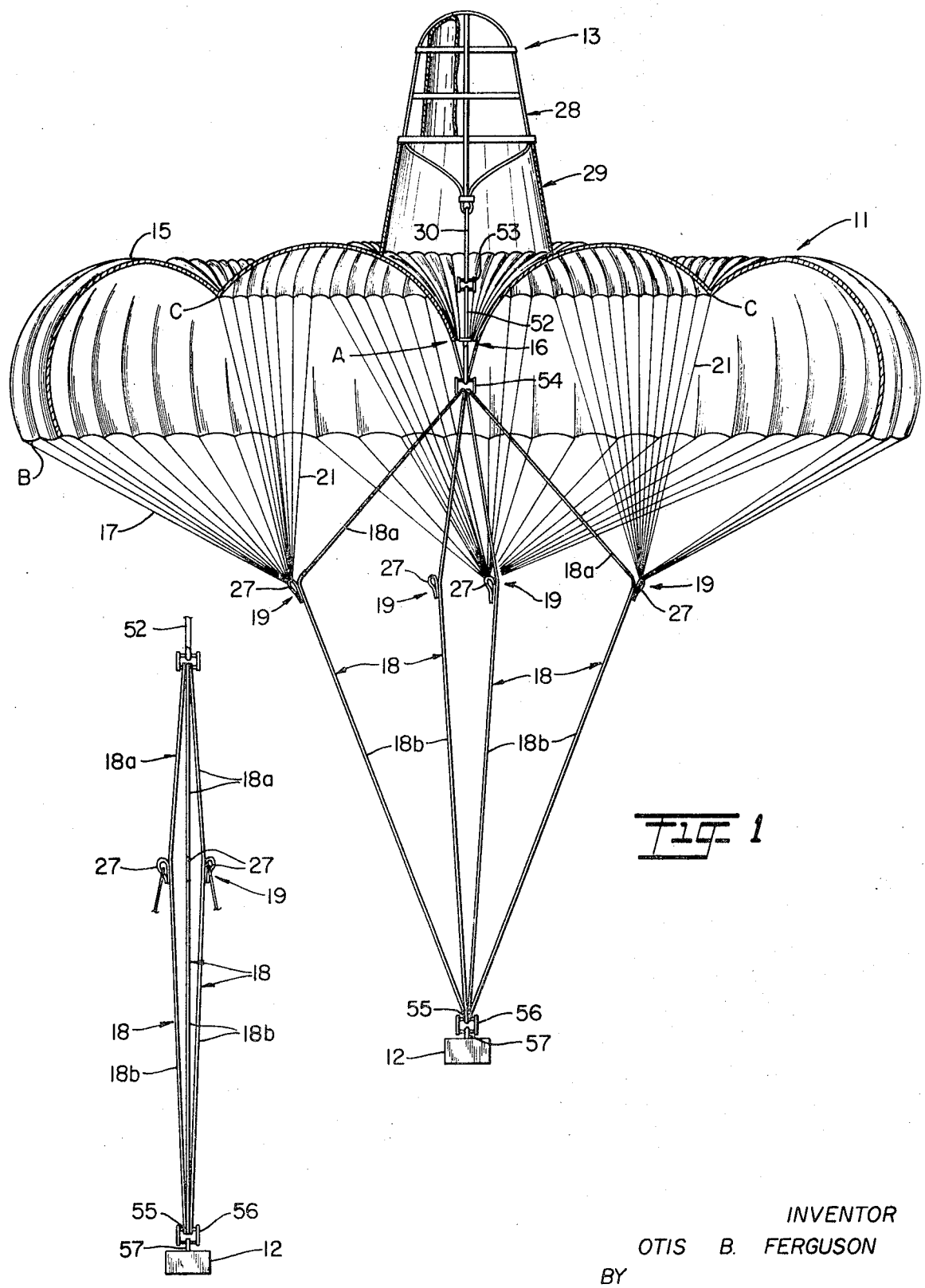

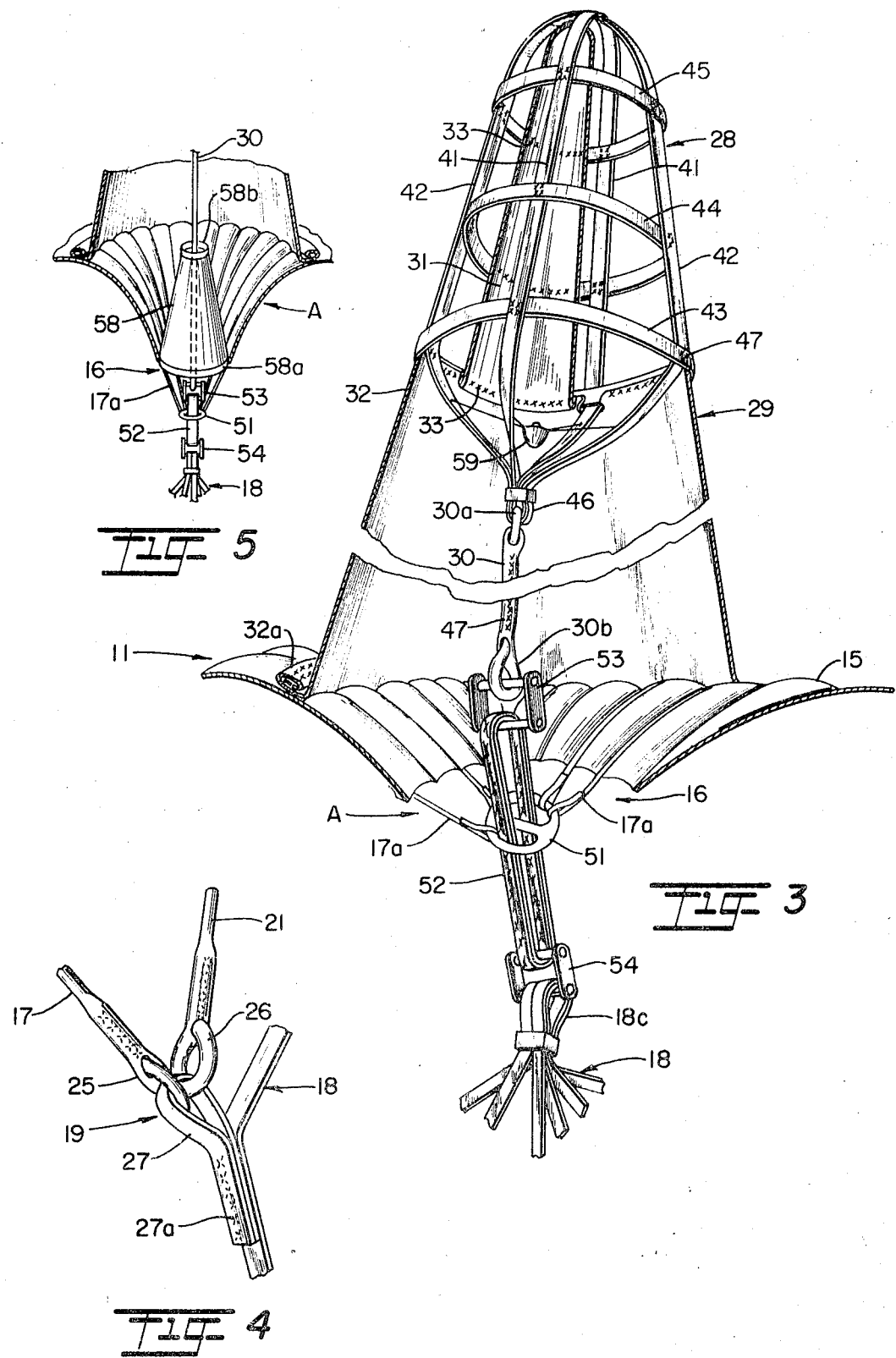

REREEFING PARACHUTE AND AERIAL RECOVERY SYSTEM

This invention relates to improvements in serial devices and particularly those utilized in combination in mid-air recovery systems.

Mid-air recovery systems broadly stated comprise a main parachute for supporting the payload prior to an aerial recovery and an inflatable engagement assembly disposed above the main parachute and connected to the payload by a load line; the engagement assembly being engaged by a pick up device depending from a recovery aircraft. The inflatable engagement assembly has heretofore taken the form of an auxiliary parachute with a canopy and an engagement harness being carried by the canopy together with a load line connected between the engagement harness and payload. In U.S. Pat. NO. 3,227,403, there is disclosed an engagement assembly harness having an arrangement of interlaced primary and secondary load bearing bands which greatly minimize or reduce the possibility of tear-out upon engagement by a pick up device such as a hook. More recently, in mid-air recovery systems described in U.S. Pat. Nos. 3,389,880 and 3,434,680 provide a main parachute which will reopen to again support the payload in the event that the mid-air recovery has to be aborted. The principal features of improvement of the present invention relate to novel and improved main parachute characterized by double reef suspension lines and novel and an improved engagement assembly including an inflatable extension.

Accordingly, it is an object of this invention to provide an improved parachute for relatively heavy loads suitable for low-level payload drops, mid-air engagements, payload towing from an aircraft and reopening for airborne support of the payload upon release from an in-tow position.

A further object of this invention is to provide an improved mid-air recovery system characterized by a faster inflating of the main parachute and an enclosed form of inflatable engagement assembly.

Another object of this invention is to provide a lightweight, balloon like body for supporting the engagement harness in a mid-air recovery system which is fully closed above the main parachute to provide a stable target at a desired elevation above the main parachute for a mid-air engagement by a recovery aircraft.

Yet another object of this invention is to provide an inflatable extension for supporting the engagement harness above a main parachute in the form of an air-confining skin, wider at the bottom and narrower at the top, which mounts on the canopy to be inflated by the canopy pressure and may enclose and carry an illuminating member or target package for signaling purposes.

Still a further object of this invention is to provide a mid-air recovery system which can be used during night or inclement weather conditions.

In accordance with the present invention there is provided a parachute particularly suitable for use as the main load-bearing device in a mid-air recovery system, the parachute having intermediate load-bearing suspension lines connected at spaced points of attachment to an intermediate portion of the canopy and connected between an attaching juncture of one of several groups of the skirt suspension lines extending from the skirt and one of several control lines extending between the central portion of the canopy and the payload to distribute the weight of the payload between the central, intermediate and skirt portions of the canopy, each being pulled down from the topmost part of the inflated canopy to provide a flatter canopy profile. An inflatable extension is mounted on to the top of the canopy and a canopy-like cap portion closes the top of the extension and carries the engagement harness to confine a volume of air above the main parachute and support the engagement harness as a stable target for a pick up engagement by a recovery aircraft. Illuminating means or a target package may be carried in the extension.

The foregoing objects, features and capabilities of the present invention will be apparent from the following more particular description of preferred embodiments of the invention, as illustrated in the accompanying drawings, in which:

FIG. 1 is an elevation view of a mid-air recovery system embodying features of the present invention with portion of the inflatable extension and the main parachute canopy broken away to show interior construction.

FIG. 2 is a side elevation view showing the contracted position of control lines while being supported from above by towing forces provided by a recovery aircraft.

FIG. 3 is an enlarged fragmentary view showing the details of the engagement assembly and its attachment to the control lines;

FIG. 4 is a fragmentary view showing the connection of the group of skirt and a group of intermediate suspension lines to an intermediate portion of a control lines; and FIG. 5 is a fragmentary view of an air metering valve which may be provided in the central apex portion of the parachute canopy.

Referring now to the drawings, the mid-air recovery system shown in an inflated, airborne condition, broadly stated, comprises a main parachute 11 with rigging lines to support a payload 12 and an inflatable engagement assembly 13 fixedly mounted on top of the main parachute 11 to provide a target for a mid-air engagement by a recovery aircraft. The recovery aircraft is typically a helicopter provided with a depending cable and a pick up hook which will engage the assembly 13 in a recovery and towing procedure and which will reopen to support the payload if the recovery is aborted as is fully described in U.S. Pat. No. 3,434,680.

The main parachute 11 comprises a canopy 15 having a central portion A provided with an air vent or central aperture 16. A portion of the rigging for the canopy is similar in construction and operation to that described in U.S. Pat. No. 3,434,680 and is herein shown as outer suspension lines 17 secured at spaced circumferential points of attachment at the skirt portion B of the canopy together with control lines 18, herein shown as four, which come together at an upper confluence and connect to the central portion A of the canopy and come together at a lower confluence and connect to the payload 12. An intermediate portion of each control line is secured to a group of suspension lines herein shown as spanning an arc of 90° on the canopy, at an attaching juncture 19 located between the center and skirt of the canopy, and substantially below the inflated canopy, the length of the skirt suspension lines 17 being approximately the same but slightly greater than the length of the upper portion 18a of each control line between juncture 19 and the upper confluence so that the weight of the payload is distributed between the skirt portion and the central portion of the canopy and each upper control line portion 18a bears a substantial portion of the weight of the payload. As an example the length of the skirt suspension lines may be 27 feet and the upper control line portion 18a, 22 feet. A lower control line portion 18b extends between the juncture 19 and the lower confluence of the control lines. This rigging is arranged to pull the central portion A of the canopy down below its topmost part while airborne and spreads the control lines 18 in a bowstring action under the pulling influence of the inflated canopy and skirt suspension lines to pull the control lines away from each other and from a vertical axis through the center of the canopy; the upper portion 18a of each control line spreading or diverging away from the upper confluence of the control lines to juncture 19 and the lower portion 18b converging from juncture 19 to the lower confluence of the control lines.

The main parachute 11 is further provided with intermediate or secondary suspension lines 21 secured at spaced circumferential points of attachment to an intermediate portion C of the canopy preferably located half-way between the central portion A and the skirt B. Each of four groups of these intermediate suspension lines are secured at one of the attaching junctures 19 at the intermediate portion of a control line 18 and the ends of one of the several groups of the suspension lines 17. Each group of secondary suspension lines spans the same segment of the canopy as an associated group of skirt suspension lines 17 and are preferably of the same length as the skirt suspension lines. In this way the secondary suspension lines pull the intermediate portion B of the canopy down from the topmost part and bear a portion of the weight of the payload. The constructed diameter of the canopy skirt is of sufficient size to allow the canopy to fill to an inflated diameter 85 percent of constructed diameter. This arrangement decreases the fill time, thereby decreasing the opening time of the main canopy to full inflation. The canopy presents a large flattened, low profile and forms a stable surface from which an inflatable extension described hereinafter may be flown for a mid-air pick up.

Each of the intermediate or secondary suspension lines may be secured to the canopy in a manner well known in the parachute art by providing an intermediate reinforcing band (not shown) disposed circumferential on the outside portion of the canopy midway between the central portion A and the skirt portion B. Each secondary suspension line 21 which is preferably equal in length to that of each skirt suspension line 17 is attached to the radial tapes of each gore at a point inside the canopy where the radial tapes and the intermediate reinforcing band intersect. The lower end of each intermediate suspension line 21 is connected to the same attaching point on the control line as a corresponding skirt suspension line which is in alignment radially therewith.

One preferred form of connection attachment juncture 19 for a group of the skirt suspension lines 17, and a group of the intermediate suspension lines 21, with the intermediate portion of one of the control lines 18 is illustrated more fully in FIG. 4. Each group of the skirt suspension lines 17 terminate in a wrapped end loop 25, and in turn each associated group of secondary suspension lines 21 terminate in a wrapped end loop 26. An attaching loop 27 extends through or interloops with loops 25 and 26 and is secured to an intermediate portion of control line 18 as by stitching 27a, and in this way there is provided adequate flexibility for the interconnected looped ends of the groups of lines to permit them to twist and turn when the control lines are expanded and contracted in the opening and collapsing of the parachute.

By the use of a secondary set of suspension lines, the weight of the payload on the primary skirt lines is reduced and transferred to the secondary suspension lines, allowing the main canopy skirt to fill to a larger inflated diameter with the same "G" loading of 25 feet per second or less rate of descent and the main canopy will lower a larger load at a given rate of descent than the same canopy of conventional construction. The canopy pick up and re-inflation capabilities after release in mid-air is greatly increased. The payload on pick up is carried by the control lines and secondary suspension lines. If, due to an eccentric loading at pick up, some of the secondary suspension lines are broken, the primary skirt lines will inflate the canopy into a re-reef configuration when the payload is cut free from recovery aircraft during a mission.

The engagement assembly 13 is generally comprised of an engagement harness or engagement band network 28 and an inflatable support skin or body 29 to support the engagement harness at a desired elevation above the main parachute to present a suitable target for the recovery aircraft. A load line 30 is connected between lower end of the harness 28 and a common connection at the central portion A of the canopy at the upper confluence of the control lines 18 as described more fully hereafter.

The inflatable body 29 is comprised of an upper canopy-like cap or crown portion 31 on which the engagement harness is mounted and a lower extension 32 which connects between the lower periphery of the cap portion and canopy to fully enclose a volume or space above the main canopy. The shape of the extension 32 is essentially cone-shaped with an open bottom and an open top and is wider at the bottom than the top and is constructed of a zero porosity material such as nylon to serve as essentially a closed conduit from the main parachute to the canopy-like cap portion 31. The attachment of the extension to the main canopy may be accomplished by a reinforcing band sewn on the main load canopy in a radius from the center of the main canopy which is long enough in circumference to match circumference of the extension base. The extension base is then folded and machine sewn to the extension band on the main canopy as represented of 32a. This inflatable extension can be made to a variety of lengths to accomplish a desired mission.

The engagement harness 28 is comprised of primary load-bearing bands 41 and 42 which extend from a lower confluence connection with the load line 30 upwardly through an upper apex where they cross at right angles and are secured together to one another and then return to the lower confluence located inside the extension 32. Three secondary load-bearing bands 43, 44 and 45 in the form of endless loops are disposed at different elevations along the primary bands. The engagement harness 28 is secured to the outside of the cap portion 31 as by stitching as represented at 33 and the lower end of the cap portion is folded back on itself and secured to the lowermost secondary band 43. The upper end of the extension is secured to the cap portion and band 43 using preferably a basting-type stitch.

Each of the secondary bands is interlaced with the primary bands along their circumferential extent in that they extend over one primary band, then under the next, over the next and under the next at spaced points of attachment or interconnection with the primary bands and the portions between the interconnections define pick up areas for engagement by the pickup device carried by recovery aircraft. The attachments between the primary and secondary bands is by preferably stitching as represented at 47. The significance of having interlaced primary and secondary bands disposed in an over-and-under relationship is explained in my U.S. Pat. No. 3,277,403 and in reissued application, Ser. No. 659,823, filed June 26, 1967, and in essence provide greatly increased strength and reliability for the engagement harness since each secondary band is attached at spaced points of interconnection to the primary band and the primary and secondary bands are interlooped with one another. In this way the engagement shock is distributed over several points of interconnection and the interlooped bands provide an additional connection if the stitching breaks. The bands 41 and 42 of the harness are considered to be main or primary lines since they will transfer the engagement forces directly to the payload through the load line and the control lines. Bands 43, 44 and 45 of the engagement harness are considered secondary bands since they transfer the recovery forces to the primary bands and then to the load line.

The lower ends of the primary bands which come together at a lower confluence within the extension are formed with a terminal attaching loop 46 interlooped with a loop 30a at the upper end of the load line 30. The lower end of the load line 30 has a loop designated 30b. This lower loop 30b is connected to the common connection at the central portion A of the canopy and the upper confluence of the control lines as best shown in FIG. 3. This interconnection at the central portion of the canopy includes a divided ring 51 to which are secured the inner ends of the radially extending lines 17a carried by the canopy. An endless strap 52 is interlooped with the central portion of the divided ring 51. An upper clevis and pin assembly 53 connects the upper end of the band 52 to the lower loop 30b of the load line and a lower clevis and pin assembly 54 connects the lower end of strap 52 with terminal loops 18c at the upper confluence of the control lines. In turn, the lower confluence of the control lines is formed with loops 55 which connect by a clevis and pin assembly 56 connecting the control lines to a loop 57 secured to the payload 12. Although the use of end loops, bands and clevises and clevis pins are shown herein one form of interconnecting hardware for the various lines, it is understood that other forms may be employed.

Upon engagement of the harness 29 by the pick up device, the weight of the payload is transferred from the canopy to the load line and control lines and the control lines collapse as shown in FIG. 2 and the canopy collapses to a flag-like configuration for towing or the drawing of the payload into the aircraft if desired. In mid-air recovery operations the main canopy and engagement harness with inflatable extension can be reeled on to the drum of the pick up aircraft and the main canopy and payload can be towed in a flag configuration and docked, or cut loose to re-inflate. The inside pressure of the canopy may be used to inflate the inflatable body 29 to a "G" pressure equal to or higher than the pressure of the canopy in stable state. As shown in FIG. 5 an additional feature of an air inflation or metering valve 58 is provided in the vented aperture 16 in the canopy, which will control the inflation of the inflatable extension. The valve 58 shown in FIG. 5 is generally conical in shape and of a zero porosity material and wider at the bottom 58a and narrower at the top 58b and open at both ends with the bottom end 58a being sewn to the lowermost part of the center of the canopy. The pressure from the canopy will be shut off by the higher internal pressure inside the inflatable extension, closing the metering valve. Thus, for a period of time until the pressures inside the main parachute canopy and the inflatable extension equalize, the extension will have a higher internal pressure and present a firm and erect pickup target.

The inflatable body 29 can be illuminated by a light 59 disposed therein on the engagement loops as shown or at the central portion of the main canopy for night or inclement weather pick ups. The inflatable extension is also capable of sustaining a target package (Radar, Radio, Light Float, etc.) in a similar location as the light 59. This weight of the inner packages is regulated by internal pressure of inflatable extension.

Although the present invention has been described with a certain degree of particularity, it is understood that the present disclosure has been made only by way of example and that changes in details of structure and system components may be made without departing from the spirit thereof.

What is claimed is:

1. In a mid-air recovery system for a payload the combination comprising a main parachute having canopy with a vented central portion, the vent in the canopy being relatively small as compared to the total diameter of the canopy, suspension lines secured to the canopy extending from the outer periphery thereof and line means connected between the central portion of the canopy and payload and connected to the suspension lines for pulling the central portion of the canopy down while airborne, an engagement assembly including an engagement harness connected to the payload and an inflatable canopy-like cap carrying the harness, an inflatable gas-confining extension of substantially zero porosity material connected between the main canopy and cap for inflating to support said harness above the main parachute, said extension having its bottom edge secured to the top of the canopy throughout its circumferential extent about the vented central portion of the canopy and having its upper edge secured to the cap throughout its circumferential extent so as to be closed at the top by the cap whereby to inflate through the vented central portion in the canopy during an airborne descent of the payload.

2. In a mid-air recovery system as set forth in claim 1 wherein said extension is essentially hollow and cone-shaped to close a space between the cap and the top of the main canopy.

3. In a mid-air recovery system as set forth in claim 2 wherein said extension is wider at the bottom and narrower at the top.

4. In a mid-air recovery system for a payload including a main parachute having canopy with a vented central portion and suspension lines secured to the canopy for carrying the suspended payload, an inflatable engagement assembly disposed above the main parachute having a harness including a primary load-bearing band connected to the payload and a secondary load-bearing band interlaced with the primary band for engagement by a pick up device carried in a depending manner from a recovery aircraft, and an inflatable skin for carrying the harness including an upper cap portion and an inflatable gas-confining extension connected between the main canopy and cap portion, said extension having an open bottom secured to the top of the canopy about the vented central portion of the canopy and having its top closed by the cap portion to inflate through the vented portion in the canopy during an airborne descent of the payload, and an air metering valve disposed in the vented central portion to regulate the filling of the inflatable skin.

5. In a mid-air recovery system for a payload the combination comprising a main parachute having canopy with a vented central portion, the vent in the canopy being relatively small as compared to the total diameter of the canopy, and suspension lines secured to the canopy extending from the outer periphery thereof and control lines connected between the central portion of the canopy and payload and connected to the suspension lines for pulling the central portion of the canopy down while airborne, and an inflatable engagement assembly disposed above the main parachute having a harness including a primary load-bearing band connected to the payload and a secondary load-bearing band interlaced with the primary band for engagement by a pick up device carried in a depending manner from a recovery aircraft, and an inflatable skin for carrying the harness including an upper cap portion and an inflatable gas-confining extension of zero porosity material connected between the main canopy and cap portion, said extension having its bottom edge secured to the top of the canopy throughout its circumferential extent about the vented central portion of the canopy and having its top edge secured to the cap portion throughout its circumferential extent to inflate through the vented portion in the canopy at a controlled rate during an airborne descent of the payload.

6. In a mid-air recovery system as set forth in claim 4 including a light source mounted in the extension to illuminate the engagement assembly.

7. In a mid-air recovery system as set forth in claim 4 including a target package mounted in the extension.

8. In a mid-air recovery system as set forth in claim 5 wherein said engagement harness includes a pair of primary load-bearing bands, each said band extends from a lower confluence point up through an apex and back to the lower confluence point with the primary bands crossing at right angles at the apex.

9. In a mid-air recovery system as set forth in claim 5 wherein said engagement harness includes a plurality of secondary load-bearing endless bands disposed at spaced intervals along the primary bands between a lower confluence point and the apex, each said secondary band extending at substantially right angles to the primary band and in an over and under relation at spaced points of connection between the secondary band and primary band.

10. In a mid-air recovery system for a payload comprising a main parachute having a vented central portion, the vent in the canopy being relatively small as compared to the total diameter of the canopy, and suspension lines secured to the canopy extending from the outer periphery thereof and line means connected between the central portion of the canopy and payload and connected to the suspension lines for pulling the central portion of the canopy down while airborne, an engagement harness including a primary load-bearing band connected to the payload and a secondary load-bearing band interlaced with the primary band for engagement by an aerial pick up device, and an inflatable skin of zero porosity mounted on the canopy for supporting said harness above the main parachute, said skin member having its bottom edges encompassing the vented central portion with an air inlet through the vented central portion to fill through the vented portion in the canopy at a controlled rate during an airborne descent of the payload.

11. In a parachute, a canopy having a vented central portion and a skirt suspension lines extending from spaced circumferential points of attachment on the skirt for supporting a payload, control lines extending between an upper confluence attached to a central portion of the canopy and a lower confluence attached to the payload, an intermediate portion of each of said control lines being secured at an attaching juncture to one of several groups of said suspension lines at a connection spaced from the canopy between the skirt and the center of the canopy to pull the central portion of the canopy below the topmost part of the canopy while airborne and draw the control lines in a bowstring-like action outwardly of each other and away from a vertical axis through the center of the canopy during airborne descent of the payload, the improvement comprising intermediate suspension lines extending from spaced circumferential points of attachment from an intermediate portion of the canopy, each of several groups of the intermediate suspension lines being attached between the attaching juncture of a control line and a group of the skirt suspension lines to pull the intermediate portion of the canopy down below the topmost part of the canopy while airborne in a double-reef suspension line configuration for the canopy.

12. In a parachute including a canopy and skirt suspension lines connected at spaced points on the canopy and extending beyond the outer edges of the canopy for the support of a payload therefrom, intermediate suspension lines connected at spaced points on an intermediate portion of the canopy between the central portion and the skirt of the canopy, and a control assembly for said canopy and suspension lines including a plurality of control and load supporting line means of a corresponding dimension converging at upper end portions arranged for support from a central portion of the canopy and converging at a lower end portion arranged for connection to a payload, an intermediate portion of one of each of said control and load supporting line means being attached to end portions of a group of said intermediate suspension lines and a group of said skirt lines, each said control and supporting line means including an upper portion above its attachment to an associated group of suspension lines having a substantial portion of the weight of the payload supported therefrom for distribution of the weight of the payload between the central portion, intermediate portion and outer edge portion of the canopy to pull the central portion and intermediate portion of the canopy substantially below the topmost part of the canopy and thereby spread each control and load supporting line means in a bowstring action outwardly from each other and from a vertical axis through the center of the canopy during airborne descent of the payload.

13. In a mid-air recovery system for a payload including a main parachute having a canopy with a vented central portion and skirt suspension lines extending from spaced circumferential points of attachment on the skirt for supporting a payload, control lines extending from points of attachment at the central portion of the canopy for supporting the payload, an intermediate portion of one of each of said control lines being attached to one of several groups of suspension lines at a connection spaced from the canopy between the skirt at a central portion of the canopy to pull the central portion of the canopy below the topmost part while airborne and draw the control lines in a bowstring-like action outwardly from each other and away from a vertical axis through the center of the canopy, intermediate suspension lines extending from spaced circumferential points of attachment from an intermediate portion of the canopy between the central portion and the skirt, one of several groups of the intermediate suspension lines attached at opposite ends between a control line and a group of the suspension lines to pull the intermediate portion of the canopy down below the topmost part while airborne in a double-reef suspension line configuration, an inflatable engagement assembly adapted for engagement by a pick-up device carried in a depending manner from a recovery aircraft, said engagement assembly comprising an engagement harness, an inflatable canopy-like cap for carrying the harness and an inflatable extension mounted on the canopy for supporting said harness above the main parachute, said extension having an open top closed by the cap and an open bottom encompassing the vented central portion inwardly of the intermediate suspension lines attachment to the canopy and having an inlet through the vented central portion to inflate through the vented portion in the canopy during an airborne descent of the payload.

* * * * *